(12) United States Patent
Kim et al.

(10) Patent No.: US 9,607,419 B2
(45) Date of Patent: Mar. 28, 2017

(54) METHOD OF FITTING VIRTUAL ITEM USING HUMAN BODY MODEL AND SYSTEM FOR PROVIDING FITTING SERVICE OF VIRTUAL ITEM

(71) Applicant: Electronics and Telecommunications Research Institute, Daejeon (KR)

(72) Inventors: Ho Won Kim, Seoul (KR); Seung Wook Lee, Daejeon (KR); Ki Nam Kim, Daejeon (KR); Jin Sung Choi, Daejeon (KR); Bon Ki Koo, Daejeon (KR); Kyu Sung Cho, Suwon (KR); Tae Joon Kim, Daejeon (KR); Sung Ryull Sohn, Daejeon (KR); Do Hyung Kim, Chungcheongbuk-do (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 180 days.

(21) Appl. No.: 14/106,532

(22) Filed: Dec. 13, 2013

(65) Prior Publication Data

US 2014/0168217 A1 Jun. 19, 2014

(30) Foreign Application Priority Data

Dec. 14, 2012 (KR) .......................... 10-2012-0146536
Oct. 22, 2013 (KR) .......................... 10-2013-0125889

(51) Int. Cl.
*G06Q 30/06* (2012.01)
*G06T 13/40* (2011.01)
*G06T 19/20* (2011.01)

(52) U.S. Cl.
CPC ......... *G06T 13/40* (2013.01); *G06Q 30/0643* (2013.01); *G06T 19/20* (2013.01); *G06T 2210/16* (2013.01); *G06T 2219/2021* (2013.01)

(58) Field of Classification Search
None
See application file for complete search history.

(56) References Cited

U.S. PATENT DOCUMENTS

| 2004/0021660 | A1* | 2/2004 | Ng-Thow-Hing | G06K 9/00369 345/419 |
| 2010/0111370 | A1* | 5/2010 | Black | G06K 9/00369 382/111 |

(Continued)

FOREIGN PATENT DOCUMENTS

| CN | 102156810 A | 8/2011 |
| CN | 102298797 A | 12/2011 |

(Continued)

OTHER PUBLICATIONS

Xu, Fengliang, and Kikuo Fujimura. "Human detection using depth and gray images." Advanced Video and Signal Based Surveillance, 2003. Proceedings. IEEE Conference on. IEEE, 2003.*

(Continued)

*Primary Examiner* — Kee M Tung
*Assistant Examiner* — Xin Sheng

(57) ABSTRACT

A method of fitting a virtual item using a human body model and a system for providing a fitting service of a virtual item are provided, the method including determining whether a user is located in an experience area, loading a three-dimensional (3D) standard avatar corresponding to setting information input by the user when the user is located in the trial area, obtaining a depth image of the user corresponding to a preset posture, transforming the 3D standard avatar into a user avatar reflecting body characteristics of the user, using a depth image of the user, fitting a virtual item selected by (Continued)

the user to the user avatar, and applying a motion of the user changing in real time to the user avatar to which the virtual item is fitted.

16 Claims, 11 Drawing Sheets

(56) References Cited

U.S. PATENT DOCUMENTS

| | | | |
|---|---|---|---|
| 2011/0007079 A1* | 1/2011 | Perez | G06F 3/011 345/473 |
| 2011/0279475 A1* | 11/2011 | Ikenoue | G06T 7/208 345/619 |
| 2012/0086783 A1* | 4/2012 | Sareen | G06N 3/006 348/47 |
| 2012/0204118 A1* | 8/2012 | Lefar | G06Q 10/10 715/756 |
| 2012/0218262 A1* | 8/2012 | Yomdin | G06T 13/80 345/419 |

FOREIGN PATENT DOCUMENTS

| | | |
|---|---|---|
| CN | 102750439 A | 10/2012 |
| EP | 2 455 895 A1 | 5/2012 |
| JP | 2005-535031 A | 11/2005 |
| KR | 10-2006-0079883 A | 7/2006 |
| KR | 10-2007-0051384 A | 5/2007 |
| KR | 10-2012-0052228 A | 5/2012 |
| WO | WO 2004/013814 A1 | 2/2004 |
| WO | WO 2011/008659 A2 | 1/2011 |

OTHER PUBLICATIONS

Wang, Charlie CL. "Parameterization and parametric design of mannequins." Computer-Aided Design 37.1 (2005): 83-98.*
Yuan, Miaolong, Ishtiaq Rasool Khan, and Farzam Farbiz. "Aligning a 3D headless avatar with a user's 2D face images in real-time." SIGGRAPH Asia 2012 Posters. ACM, Nov. 28-Dec. 1, 2012.*
Sun Shan-Shan et al., "Research on Three-Dimensional (3D) Online Fitting Room Based on Virtual Reality", Journal of Hubei University of Technology, Aug. 2011, pp. 1-2, vol. 26, No. 4, China.
Howon Kim et al., "Appearance-Cloning: Photo-Consistent Scene Recovery from Multi-View Images", International Journal of Computer Vison, Jul. 5, 2005, pp. 163-192, vol. 66, No. 2, Springer Science + Business Media, Inc., The Netherlands.

* cited by examiner

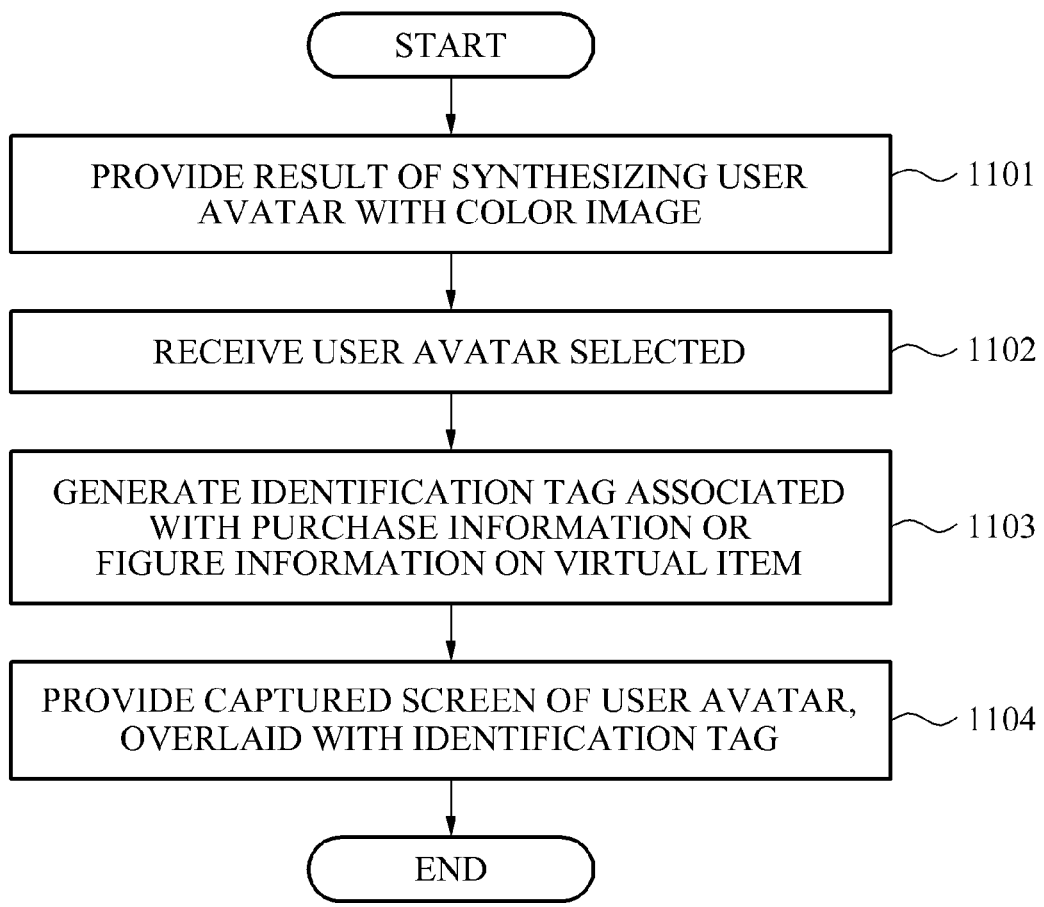

METHOD OF FITTING VIRTUAL ITEM USING HUMAN BODY MODEL AND SYSTEM FOR PROVIDING FITTING SERVICE OF VIRTUAL ITEM

CROSS-REFERENCE TO RELATED APPLICATIONS

This application claims the priority benefit of Korean Patent Application No. 10-2012-0146536, filed on Dec. 14, 2012, and Korean Patent Application No. 10-2013-0125889, filed on Oct. 22, 2013, in the Korean Intellectual Property Office, the disclosures of which are incorporated herein by reference.

BACKGROUND

1. Field of the Invention

The present invention relates to a method of fitting a virtual item and system for providing a fitting service for a virtual item, and more particularly, to a method and system for determining fitting of a virtual item and an overall look without actually wearing an item desired by a user, through use of a three-dimensional (3D) human body model reflecting an appearance and a skeletal structure of the user.

2. Description of the Related Art

In recent times, an introduction of a depth sensor has allowed users to readily obtain user shape information and joint motion information at a reasonable price. Consequently, applications of the depth sensor resulted in changes to a user interface used in various services. More particularly, following the changes to the user interface, new interactive user services are emerging. One of the interactive user services may include a virtual item fitting service in which a user wears items, such as clothes or accessories, in a virtual setting without actually wearing the items.

In a conventional virtual item fitting service, a motion of a user provided by a depth sensor is received, an avatar rigged or skinned is controlled, and the rigged avatar is animated. Such services are provided irrespective of a body shape of the user, hence an issue of lack of reality.

In addition, a conventional service of creating a customized item is also provided by scanning an appearance of a user via a 3D full-body scanner. However, the 3D whole-body scanner used in such a service is highly expensive, and a motion of the user changing in real time may not be fully reflected due to the motion of the user being restricted during the scanning process.

Accordingly, there is a need for a solution in terms of real time processing, and a more realistic and intuitive service reflecting the motion of the user despite the user wearing clothes or accessories in a virtual setting only.

SUMMARY

An aspect of the present invention provides a method and system for readily determining whether an item desired by a user is fitted by virtually fitting the item without actually being worn.

Another aspect of the present invention also provides a method and system for verifying an overall look and readily determining a virtual item suitable for a user by fitting the virtual item on a user avatar reflecting body characteristics of the user.

Still another aspect of the present invention also provides a method and system for providing realistic effects of a user actually wearing a virtual item and moving by reflecting a motion of the user in a user avatar fitted with the virtual item.

Yet another aspect of the present invention also provides a method and system for overlaying an identification tag reflecting purchase information and figure information on a virtual item on a captured screen of a user avatar, readily purchasing the virtual item, and efficiently repairing the virtual item later.

According to an aspect of the present invention, there is provided a method of fitting a virtual item, the method including determining whether a user is located in an experience area, loading a three-dimensional (3D) standard avatar corresponding to setting information input by the user when the user is located in the trial area, obtaining a depth image of the user corresponding to a preset posture, transforming the 3D standard avatar into a user avatar reflecting body characteristics of the user, using a depth image of the user, fitting a virtual item selected by the user to the user avatar, and applying a motion of the user changing in real time to the user avatar to which the virtual item is fitted.

The transforming of the 3D standard avatar into the user avatar reflecting the appearance of the body characteristics of the user may include restoring a 3D shape patch from the depth image of the user, changing joint length information of the 3D standard avatar, using the 3D shape patch, and changing volume information of the 3D standard avatar, using the 3D shape patch.

The restoring of the 3D shape patch may include representing the depth image in a 3D mesh, using depth information of a current pixel and an adjacent pixel of the depth image, and determining a 3D position of a vertex configuring the 3D mesh based on the depth information and calibration information.

The changing of the joint length information of the 3D standard avatar may include estimating a joint structure of the user, using the 3D shape patch, and extracting joint length information of the user from the estimated joint structure, and applying the extracted joint length information to the joint length information of the 3D standard avatar.

The changing of the volume information of the 3D standard avatar may include generating a cross section vertical to a progressive direction of a joint from the joint structure of the user estimated from the 3D shape patch, and adjusting the volume information of the 3D standard avatar, using an intersection of the restored 3D shape patch and the cross section.

The fitting of the virtual item selected by the user to the user avatar may include determining a displacement between a mesh of the 3D standard avatar and a mesh of the user avatar, and applying the determined displacement to a vertex of the virtual item.

The applying of the motion of the user changing in real time to the user avatar fitted with the virtual item may include retargeting a motion of the user avatar based on 3 degrees of freedom (DOF) rotation and 3 DOF movement of a joint configuring the joint structure of the user avatar.

The applying of the motion of the user changing in real time to the user avatar fitted with the virtual item may include rendering lighting effects to the virtual item based on the motion of the user avatar.

The method of fitting the virtual item may further include synthesizing the user avatar fitted with the virtual item with the color image of the user, and providing the user avatar fitted with the virtual item.

According to an aspect of the present invention, there is provided a method of fitting a virtual item, the method including loading a 3D standard avatar based on setting information input by a user, transforming the 3D standard avatar into a user avatar reflecting an appearance of body characteristics of the user, using a depth image of the user, fitting a virtual item selected by the user to the user avatar, and synthesizing the user avatar fitted with the virtual item with the color image of the user, and providing the user avatar fitted with the virtual item to the user.

The transforming of the 3D standard avatar to the user avatar in which the appearance of the body characteristics of the user is reflected may include changing joint length information and volume information of the 3D standard avatar, based on the appearance of the body characteristics of the user.

According to an aspect of the present invention, there is provided a method of fitting a virtual item, the method including receiving a virtual item selected by a user, transforming, into a user avatar, a 3D standard avatar fitted with the selected virtual item, based on body characteristics of the user, detecting a real-time motion of the user, and applying the real-time motion to the user avatar, applying, to the user avatar, lighting effects changing based on the real-time motion of the user, and providing, to the user, the user avatar to which the real-time motion of the user and the lighting effects are applied.

The transforming of the 3D standard avatar to the user avatar may include changing joint length information and volume information of the 3D standard avatar, based on the body characteristics of the user.

The detecting of the real-time motion of the user, and applying of the real-time motion to the user avatar may include retargeting a motion of the user avatar, based on 3 DOF rotation and 3 DOF movement of a joint configuring a joint structure of the user.

The applying of the lighting effects to the user avatar may include determining an environment map based on a light source with respect to a 3D mesh configuring the virtual item.

According to an aspect of the present invention, there is provided a method of fitting a virtual item, the method including providing an interface for selecting a virtual item to a user located in an experience area for a fitting service of a virtual item, displaying a user avatar fitted with a virtual item selected by the user, generating an identification tag associated with purchase information or figure information on a virtual item when the user selects the displayed user avatar, and providing a captured screen of the user avatar, overlaid with the generated identification tag.

The displaying of the user avatar fitted with the virtual item selected by the user may include transforming a 3D standard avatar corresponding to setting information input by the user into the user avatar reflecting body characteristics of the user, and displaying the transformed user avatar.

The user avatar may correspond to an avatar of which joint length information and volume information of the 3D standard avatar are changed based on the body characteristics of the user.

According to an aspect of the present invention, there is provided a system for providing a fitting service of a virtual item, the system including a display to display an experience image of a user to provide a fitting service of a virtual item to the user, an apparatus for capturing a color image to capture the user in real time, and collect a color image of the user, an apparatus for capturing a depth image to measure a motion and a body size of the user, and an apparatus for fitting a virtual item to convert a 3D standard avatar into a user avatar based on the motion and the body size of the user, and fit a virtual item to the user avatar, wherein the apparatus for fitting the virtual item synthesizes the user avatar fitted with the virtual item with the color image, and transmits the user avatar fitted with the virtual item to the display.

The apparatus for fitting the virtual item may change joint length information and volume information of the 3D standard avatar, using a 3D shape patch restored from a depth image of the user.

The apparatus for fitting the virtual item may retarget a motion of the user avatar, based on 3 DOF rotation and 3 DOF movement of a joint configuring a joint structure of the user avatar.

The apparatus for fitting the virtual item may render lighting effects to the virtual item based on the motion of the user avatar.

According to an aspect of the present invention, there is provided a system for providing a fitting service of a virtual item, the system including a display to display an experience image of a user to provide a fitting service of a virtual item to the user, an apparatus for capturing a color image to capture the user in real time, and collect the color image of the user, an apparatus for capturing a depth image to measure a motion and a body size of the user, and an apparatus for fitting a virtual item to load a three-dimensional (3D) standard avatar based on setting information input by the user, transform the 3D standard avatar into a user avatar in which an appearance of body characteristic of the user is reflected using a depth image of the user, and fit a virtual item selected by the user to the user avatar, wherein the apparatus for fitting the virtual item synthesizes the user avatar to which the virtual item is fitted with the color image, and transmits the user avatar synthesized with the color image to the display.

According to an aspect of the present invention, there is provided a system for providing a fitting service of a virtual item, using a display, an apparatus for capturing a color image, and an apparatus for capturing a depth image, the system including an apparatus for fitting a virtual item to receive a virtual item selected by a user, and based on body characteristics of the user, transform into a user avatar, a 3D standard avatar fitted with the selected virtual item.

The apparatus for fitting the virtual item may detect a real-time motion of the user and applies the detected real-time motion to the user avatar, or provide, to the user, the user avatar to which lighting effects changing based on the real-time motion of the user are applied.

According to an aspect of the present invention, there is provided a system for providing a fitting service of a virtual item, using a display and an apparatus for capturing a color image, the system including an apparatus for fitting a virtual item to provide, via the display, an interface for selecting a virtual item to a user, generate a user avatar to which a virtual item selected by the user is fitted using a depth image obtained by an apparatus for capturing the depth image, and when the user selects a displayed user avatar, provide a captured screen of the user avatar overlaid with an identification tag associated with virtual item purchase information or figure information.

The apparatus for fitting the virtual item may change joint length information and volume information of the 3D standard avatar, and generate the user avatar, based on body characteristics of the user.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 11 is a flowchart illustrating a process of operating based on a virtual item experience result providing mode of FIG. 8 according to an embodiment of the present invention.

DETAILED DESCRIPTION

Figure 1:
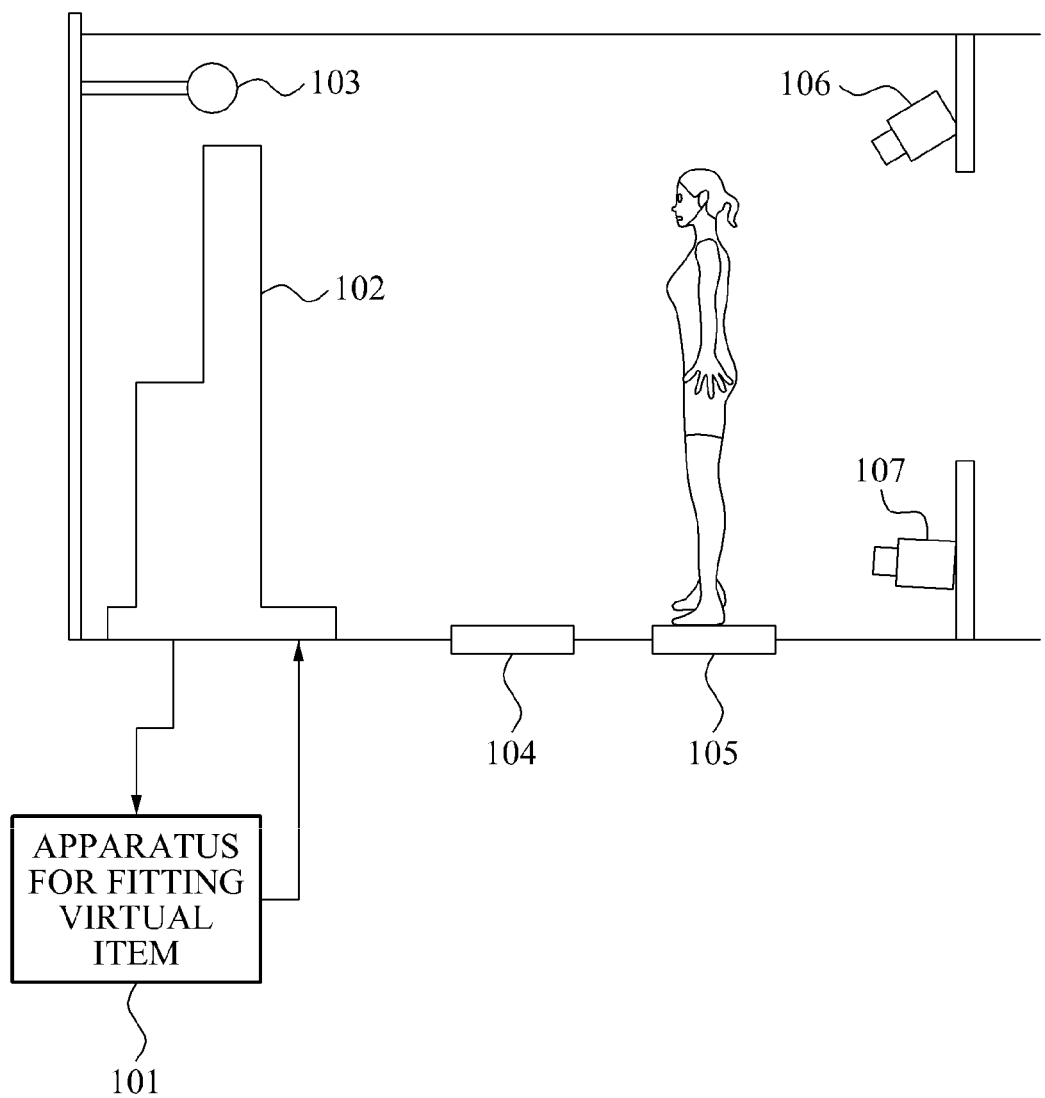
FIG. 1 is a diagram illustrating a system for providing a fitting service of a virtual item according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The present exemplary embodiment provides a method and system for measuring actual body characteristics of a user using at least one depth sensor, and fitting a virtual item using a user avatar reflecting the body characteristics. Through this, according to the present exemplary embodiment, the user is enabled to verify a virtual item suitable for the body characteristics of the user through a prior experience without having to wear various virtual items, and readily select the virtual item.

Hereinafter, a system for providing a fitting service of a virtual item provided in a kiosk form that automatically generates a user avatar reflecting body characteristics of a user by measuring an actual shape of a human body, applies a virtual item desired by the user to the user avatar, physically simulates a degree of wrinkles or fitting of clothes in real time based on a motion of the user, and provides a result of the simulation to the user will be described with reference to FIGS. 1 through 11.

FIG. 1 is a diagram illustrating a system for providing a fitting service of a virtual item according to an embodiment of the present invention.

Referring to FIG. 1, the system for providing the fitting service of the virtual item includes a display 102 and depth sensors 103, 106, and 107. A video camera for capturing a current appearance of a user in real time may be provided in the display 102. The system for providing the fitting service may be managed in a form of a kiosk. The system for providing the fitting service may be provided in stores selling items such as cloth, accessories, and the like.

The system for providing the fitting service of the virtual item may not be in the form of the kiosk, and may be applied to a household television (TV) system combined by the display 102 and the depth sensor 103, a personal computer (PC) system, or a mobile terminal. In this example, the video camera refers to a separately provided video camera, a video camera provided in a TV, or a red, green, blue (RGB) color video camera provided in a depth sensor.

The display 102 allows the user to experience a fitting service of a virtual item. The display 102 is disposed based on a gaze of the user. For example, the display 102 displays an experience image of the fitting service in a manner similar to the user making use of a mirror. Accordingly, the video camera captures the user in real time in order to display such an experience image.

Also, the depth sensor 103 measures a body shape of the user, and captures a motion of the user. In this example, the depth sensor 102 or the depth sensor 103 is disposed at a bottom, a side, and a rear of the system for providing the fitting service for accurate measurements of the body shape of the user to be taken. A number of depth sensors provided in the system for providing the fitting service is unlimited, because the greater the number of the depth sensors, the higher the accuracy. In order to meet minimum specifications, the depth sensors of the system for providing the fitting service may be provided in front of the user.

Geometry calibration of the plurality of depth sensors and the video camera provided in the system for providing the fitting service may need to be performed with respect to a single standard coordinate system. In this example, the geometry calibration refers to a process of calibrating a relative coordinate system for the plurality of depth sensors and the video camera with respect to the standard coordinate system, and calibrating an optical projection coefficient inside the plurality of depth sensors and the video camera.

The system for providing the fitting service may be operated by being classified into a resting mode, a user measuring mode, a virtual item experience mode, and a virtual item experience result providing mode.

In the resting mode, the system for providing the fitting service determines whether the user enters an experience area 105. The system for providing the fitting service captures the user via the video camera provided in the display 102, and when the user faces the display 102 directly, displays a reflection image of the user in a manner similar to the user making use of a mirror, via the display 102. In addition, the display 102 displays an operation example of the system for providing the fitting service of the virtual item in a predetermined area, and waits for the user to enter the experience area 105.

When the user enters the experience area 105, the system for providing the fitting service may be converted into the user measuring mode. Alternatively, the system for providing the fitting service may cause the user to move from the experience area 105 to a measurement area 104. In a subsequently step, the system for providing the fitting service measures an actual body shape of the user in the measurement area 104. The system for providing the fitting service may provide the user with a selection pertaining to whether the user is willing to experience the fitting service of the virtual item, via a user interface (UI) of the display 102.

In this example, the system for providing the fitting service of the virtual item obtains height information of the user based on a value of depth information between a highest portion and a bottom of a user area in a depth image obtained by capturing a motion of the user, and vertically adjusts a position of the UI based on the height information. Such adjustment is to solve difficulty in executing a UI button due to differing heights of the user in the UI using a gesture of the user. A three-dimensional (3D) space within a reach of the user by stretching an arm upward or to a side based on the height information of the user is calculated. The calculated 3D space is projected to an image coordinate system of the display 102, and UI-related buttons are disposed within the projection area, thereby settling the issue occurring on the UI due to the height. In particular, the UI-related buttons are displayed on a screen area within an arm reach of the user on the screen, and the user may perform interfacing with the system for providing the fitting service of the virtual item without moving to a different position.

When the user inputs gender information via the UI displayed on the display 102, an apparatus 101 for fitting a virtual item loads a 3D standard avatar corresponding to the gender information input by the user. In this example, the fitting service is enabled through use of a avatar customized to body characteristics of an experiencing user or an experience environment based on various categories, such as age and race, aside from the gender information.

Figure 2:
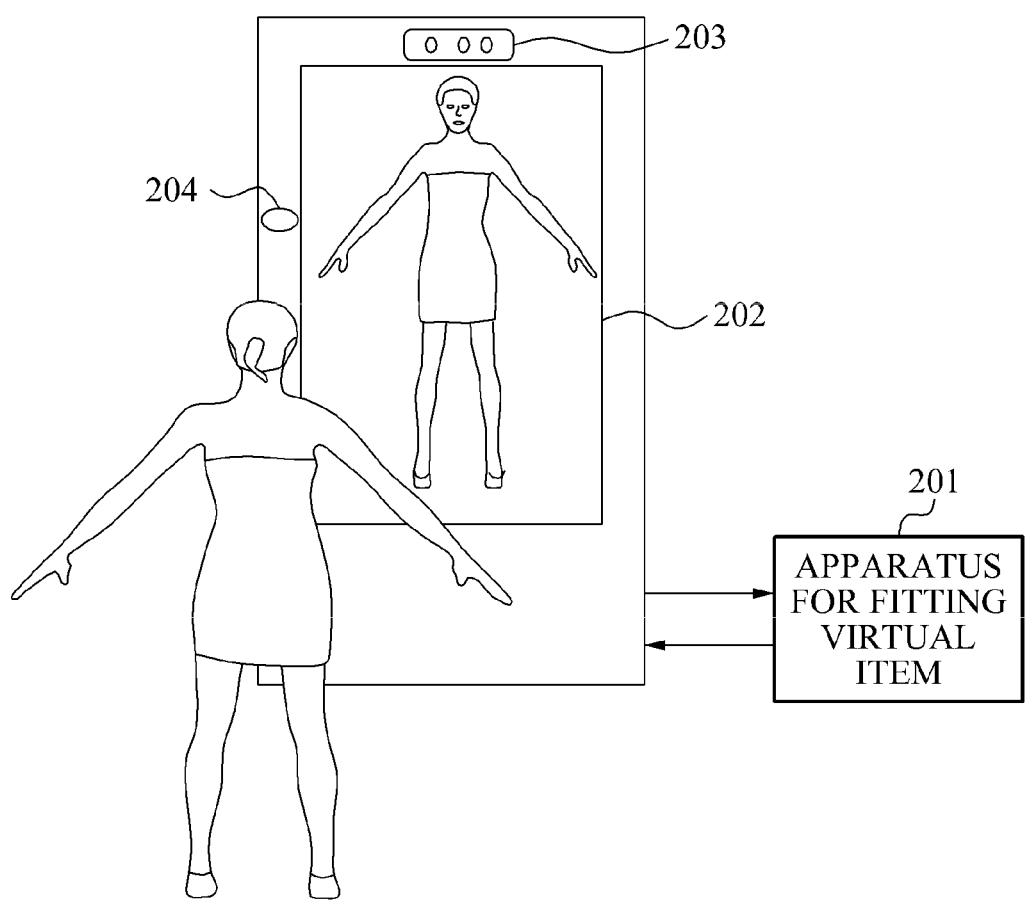
FIG. 2 is a diagram illustrating a result of displaying a fitting result of a virtual item to a user via a system for providing a fitting service of a virtual item according to an embodiment of the present invention.

FIG. 2 is a diagram illustrating a result of displaying a fitting result of a virtual item to a user via a system for providing a fitting service of a virtual item according to an embodiment of the present invention.

The system for providing the fitting service displays a silhouette image of a predetermined posture via a display 202 to obtain 3D shape information.

In this example, the silhouette image is displayed on a screen, subsequent to adjusting a size of a standard avatar by scaling throughout the standard avatar based on obtained height information of the user, projecting the transformed standard avatar directly to the display 102 in an orthographic coordinate system, and generating a two-dimensional (2D) silhouette image. Through this, a relatively more intuitive posture is induced from the user.

Also, the system for providing the fitting service displays a message requesting a user to maintain a predetermined posture for a predetermined period of time via the display 202. In this example, when the user maintains the predetermined posture displayed on the display 202 for the predetermined period of time in a measurement area or an experience area, the depth sensor 204 captures a depth image of the user, and transmits the depth image to an apparatus 201 for fitting a virtual item. An operation of a depth sensor 204 may be identically applied to a depth sensor disposed in a rear of the user.

In a subsequent step, the apparatus 201 for fitting the virtual item converts a 3D standard avatar into a user avatar reflecting body characteristics of the user using the depth image. In this example, the apparatus 201 for fitting the virtual item applies the virtual item selected by the user to the user avatar, and further applies lighting effects on a motion of the user or the virtual item. The apparatus 201 for fitting the virtual item synthesizes a rendered image of the virtual item applied to the user avatar with a color image of the user captured via a video camera 202, and provides the rendered image synthesized with the color image to the user via the display 203. The user may experience a sense of wearing the virtual item and viewing a mirror as the result of the synthesizing of the user avatar with the color image. In such a process, an image of the video camera 202 and the user avatar are flipped front and back, resulting in a reversed left and right of the image of the video camera 202 and the user avatar, to be displayed on the display 203, such that the user is provided with an effect of making use of a mirror.

The user applies the selected virtual item to the user avatar when changing the virtual item, calculates transformation of the virtual item when the same motion is applied to the user avatar as the user, synthesizes a result of rendering of the transformed virtual item with a user video camera to experience the result in real time, and selects a user avatar wearing a virtual item most fitted on the user. The apparatus 201 for fitting the virtual item converts from a waiting mode into the virtual item experience result providing mode, and captures a resulting image obtained by synthesizing a digital item selected by the user with the user video camera to provide the resulting image to the user. In this example, smart code information, such as a quick response (QR) code that enables access to information about the digital item selected by the user is provided together. Also, a depth image, a color image, joint information, and virtual item information of a predetermined posture experienced by the user are stored in a database (DB) for subsequent re-experiencing or purchasing, such that the user accesses the DB through use of the provided QR code.

Figure 3:
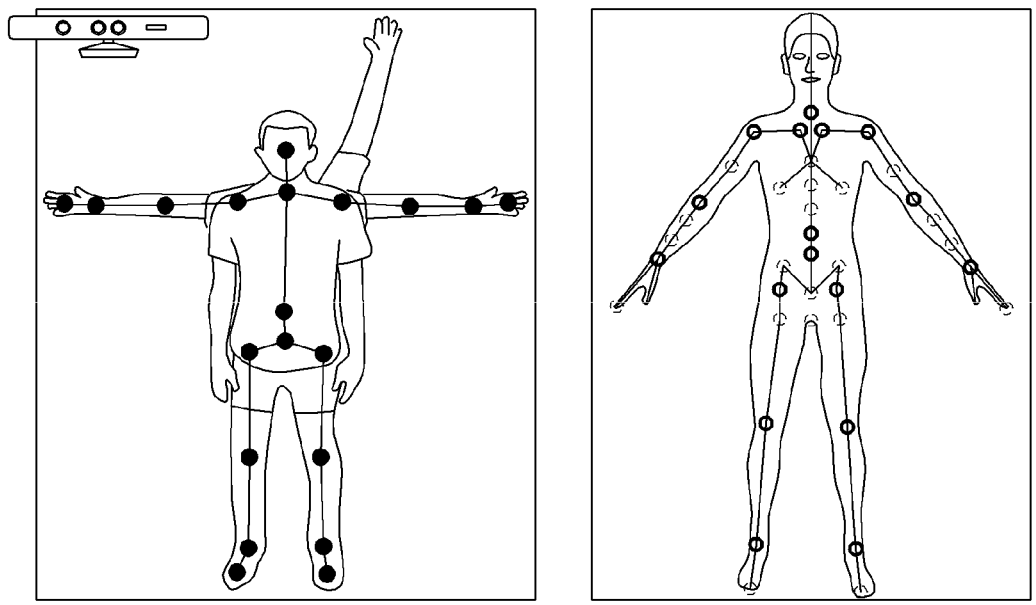
FIG. 3 is a diagram illustrating a corresponding relationship of a three-dimensional (3D) standard avatar and a joint structure according to an embodiment of the present invention.

FIG. 3 is a diagram illustrating a corresponding relationship of a 3D standard avatar and a joint structure according to an embodiment of the present invention.

An apparatus for fitting a virtual item loads the 3D standard avatar corresponding to gender information input by a user. A system for providing a fitting service provides the user with a silhouette image of a predetermined posture via a display. Also, the system for providing the fitting service provides a UI, via the display, indicating a request for the user to maintain the predetermined posture for a predetermined period of time. The user maintains the predetermined posture for the predetermined period of time by viewing the display.

In this example, a depth sensor captures a depth image of the user maintaining the predetermined posture, and transmits the captured depth image to the apparatus for fitting the virtual item. Also, a video camera captures a color image of the user maintaining the predetermined posture, and transmits the color image to the apparatus for fitting the virtual item. The apparatus for fitting the virtual item stores the depth image transmitted from the depth sensor, and the color image transmitted from the video camera, both of which are captured concurrently during a predetermined period of time. In a subsequent step, the apparatus for fitting the virtual item restores a shape of the user, and estimates a joint structure using the depth image. When the depth sensor provides motion information of the user, the apparatus for fitting the virtual item may store information on a plurality of joints of the user.

The apparatus for fitting the virtual item generates a 3D mesh including triangles or squares, using depth information of a current pixel and neighboring pixels adjacent to the current pixel of the depth image. In a subsequent step, the apparatus for fitting the virtual item determines a 3D position of a plurality of vertices configuring the 3D mesh using the depth information and geometry calibration information of the current pixel represented in the depth image, and restores 3D shape patches 401 and 402 of the user represented via a standard coordinate system.

When the 3D shape patch is restored, the apparatus for fitting the virtual item estimates the joint structure of the user. For one example, the apparatus for fitting the virtual item sets a voxel including the 3D shape patch restored in the standard coordinate system.

In particular, the apparatus for fitting the virtual item configures the 3D shape patch through a combination of voxels in a predetermined size. The apparatus for fitting the virtual item determines whether an intersection between the voxel and the 3D mesh configuring the 3D shape patch occurs in a 3D space. Accordingly, based on whether the respective voxels intersect the 3D shape patch in the 3D space, the apparatus for fitting the virtual item determines whether to fill or vacate the respective voxels in the space.

Also, when the intersection is determined to occur, the apparatus for fitting the virtual item verifies a visibility based on an origin point of a camera of the depth sensor causing the intersection, and determines whether to fill voxels corresponding to an internal body of the user. More particularly, the apparatus for fitting the virtual item selects a maximum likelihood color of a visible local appearance participated in by all of a plurality of surface voxels for forming the 3D shape patch, and determines whether to fill the plurality of surface voxels. In this example, the visibility is determined from a viewpoint of a plurality of depth sensors.

Also, the apparatus for fitting the virtual item estimates a position for a plurality of joints in a skeletal structure of the user, using information on a 3D skeletal structure for a plurality of body parts of the user and anthropometric information. More particularly, the apparatus for fitting the virtual item estimates the position for the plurality of joints using the information on the 3D skeletal structure generated for the plurality of body parts, and extracts a rotation angle for the plurality of joints using position information of the joints of the user and neighboring joints of a corresponding joint compared to position information of relative neighboring joints with respect to a plurality of joints of a standard avatar in an initial posture.

Further, the apparatus for fitting the virtual item estimates the position for the plurality of joints of the user using an error rate between information on a plurality of body parts of a 3D standard avatar and information on a plurality of body parts included in the anthropometric information of the user. When the position for the plurality of joints is estimated, the skeletal structure, for example, the joint structure of the user, is generated. A process of estimating the position for the plurality of joints will be discussed with reference to FIG. 7.

The user avatar is determined by reflecting a joint length to a 3D avatar. For example, when the joint structure of the user is generated, general joint length information on a height, an arm, and a leg of the user may be extracted. The apparatus for fitting the virtual item changes joint length information of the 3D standard avatar using the joint length information of the user, and adjusts a skeletal structure of the 3D standard avatar to be identical to the skeletal structure of the user.

When the 3D standard avatar is rigged, a 3D shape of the 3D standard avatar may be transformed corresponding to the change in the skeletal structure. In this example, the rigging refers to controlling a position for a plurality of vertices of the 3D avatar belonging to the joint structure based on a motion of the joint structure of the 3D avatar, and transforming a shape of the 3D avatar.

Figure 4:
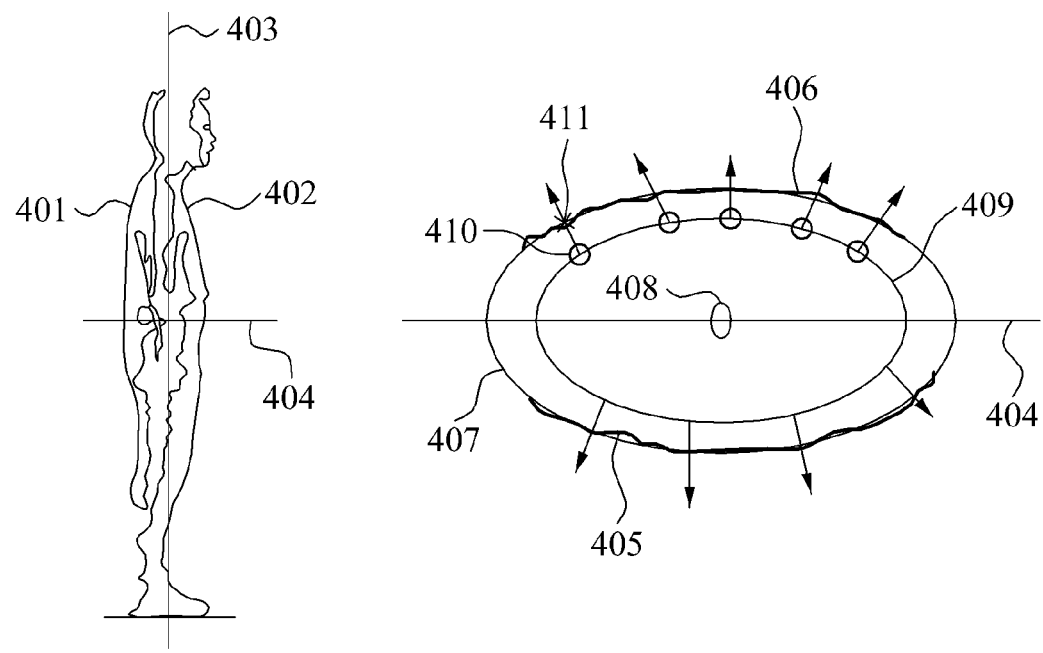
FIG. 4 is a diagram illustrating a process of reflecting volume information of a user in a 3D standard avatar according to an embodiment of the present invention.

FIG. 4 is a diagram illustrating a process of reflecting volume information of a user in a 3D standard avatar according to an embodiment of the present invention.

FIG. 3 illustrates a case in which joint length information of a user is reflected in a 3D standard avatar, however, reflecting the volume information of the user in the 3D standard avatar is yet to be discussed. For example, an apparatus for fitting a virtual item reflects the volume information of the user in the 3D standard avatar, using a joint structure of the user.

For one example, the apparatus for fitting the virtual item generates a cross section vertical to a reference axis between one joint and another joint in the joint structure of the user in order to reflect the volume information of the user in the 3D standard avatar. By way of example, the joint refers to a portion of connecting a bone and another bone, such as a shoulder and an elbow. The reference axis refers to a 3D direction vector moving from a shoulder joint to an elbow joint. The cross section vertical to the reference axis refers to a 3D cross section disposed vertically to the direction vector at a ratio predetermined based on the direction vector or at a ratio determined by the user. In particular, the apparatus for fitting the virtual item generates a cross section vertical to a progressive direction of a joint. For example, the apparatus for fitting the virtual item generates a waist cross section, a chest cross section, and the like.

Figure 5:
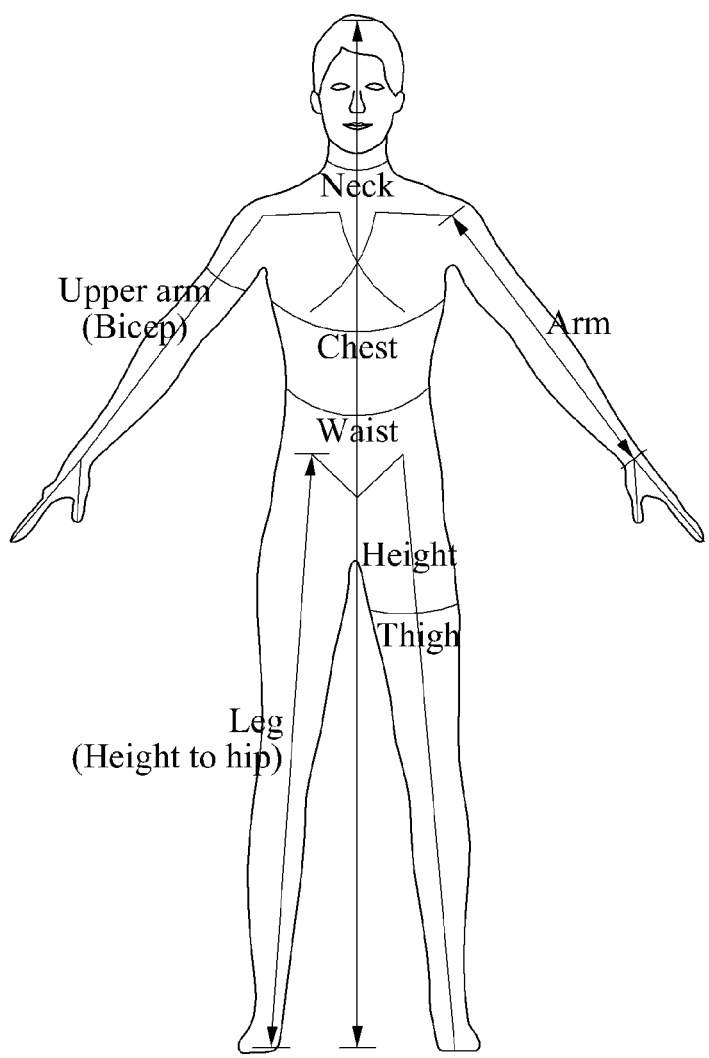
FIG. 5 is a diagram illustrating a result of measuring 8 major body parts of a user according to an embodiment of the present invention.

FIG. 4 illustrates the waist cross section 404 of the user. The apparatus for fitting the virtual item collects 3D intersection points between restored 3D shape patches 401 and 402 and the waist cross section 404 of the user, projects the 3D intersection points to a 3D cross section, and collects 2D shape information 405 and 406. A total length of the obtained 2D shape information 405 and 406 corresponds to information on a circumference of a body part of a corresponding cross section as shown in FIG. 5, and is intuitively estimable.

Also, the apparatus for fitting the virtual item extracts 2D shape information 409 obtained by projecting the intersection points corresponding to the waist cross section 404 from a 3D standard shape in the same manner as above, and determines a difference value on a surface between the 2D shape information 405 of the user and the 2D shape information 409, and a difference value on a surface between the 2D shape information 406 of the user and the 2D shape information 409.

In this example, the difference value proceeds in a direction vertical to a curvature of a plurality of reference points centered on reference points 410 obtained by sampling, at predetermined intervals, the 2D shape information 409 of the standard avatar, and searches for an intersection point 411 with the 2D shape information 406 and 407 of the user. Here, a distance between the reference points 410 and the intersection points 411 is the difference value.

In this example, the apparatus for fitting the virtual item may use an anthropometric property of a body shape of the user when the 2D shape information 409 is expanded to the 3D shape information 407 in order to intersect the 2D shape information 405 and 406 of the user because the 2D shape information 407 may be associated with a cross section of the user wearing actual clothes. By way of example, the anthropometric property of a waist portion refers to information indicating that the standard waist cross section 404 has an oval shape, and may be reflected, in advance, in generation of the 3D standard avatar. Accordingly, the apparatus for fitting the virtual item calculates a degree of transformation in which the 2D shape information 409 is expanded externally to be transformed into the 2D shape information 407 centered on a center 408 of the waist cross section 404, based on the respective difference values on the surface of the 2D shape information 405 of the user and the 2D shape information 406 of the user. In this example, the 2D shape information 409 is expanded to be transformed into the 2D shape information 407 within a range in which the 2D shape information 405 of the user and the 2D shape information 406 of the user are not exceeded. Information on the 2D expansion determines a degree of transforming a 3D shape based on 3D surface information of a cross section.

The information on the expansion of the cross sections of the plurality of joints described above is calculated with respect to all joints, and a 3D position of the plurality of vertices of the 3D standard avatar between two cross sections is expanded based on information on expansion of neighboring cross sections, through applying a linear or non-linear interpolation method. The information on the expansion of the cross sections is processed in parallel, and therefore rapidly calculated through use of multiple processors or a graphics processing unit (GPU).

Also in the aforementioned method as shown in FIG. 5, information on body size measurement, such as a height and a length of an arm and a leg is obtained based on information on a circumference of major body parts and position information. Such information is applied to a conventional method of transforming an avatar in which information on a length of a plurality of user body parts is directly received, and a size of a 3D avatar is transformed in a manner of 3D morphing. Further, the information on the body size measurement corresponds to a clothing size demarcation method generally used in clothing for sale, such that the user is directly provided with the information when selecting clothes. According to the exemplary embodiment of the present invention, it is possible to transform a standard avatar to a user avatar through directly controlling a length and a volume, guarantee compatibility to a conventional transformation method, and directly provide the user with the information on the body size measurement, thereby further providing support for experiencing and purchasing of a product.

FIG. 5 is a diagram illustrating a result of measuring 8 major body parts of a user according to an embodiment of the present invention. In particular, predetermined body parts are selected and measured in a joint structure.

As such, the volume information of the user may be reflected in the 3D standard avatar. Consequently, according to the present exemplary embodiment, a user avatar reflecting body characteristics of the user is generated by reflecting joint length information and volume information of the user in a 3D standard avatar, and transforming the joint length information and the volume information.

Figure 6:
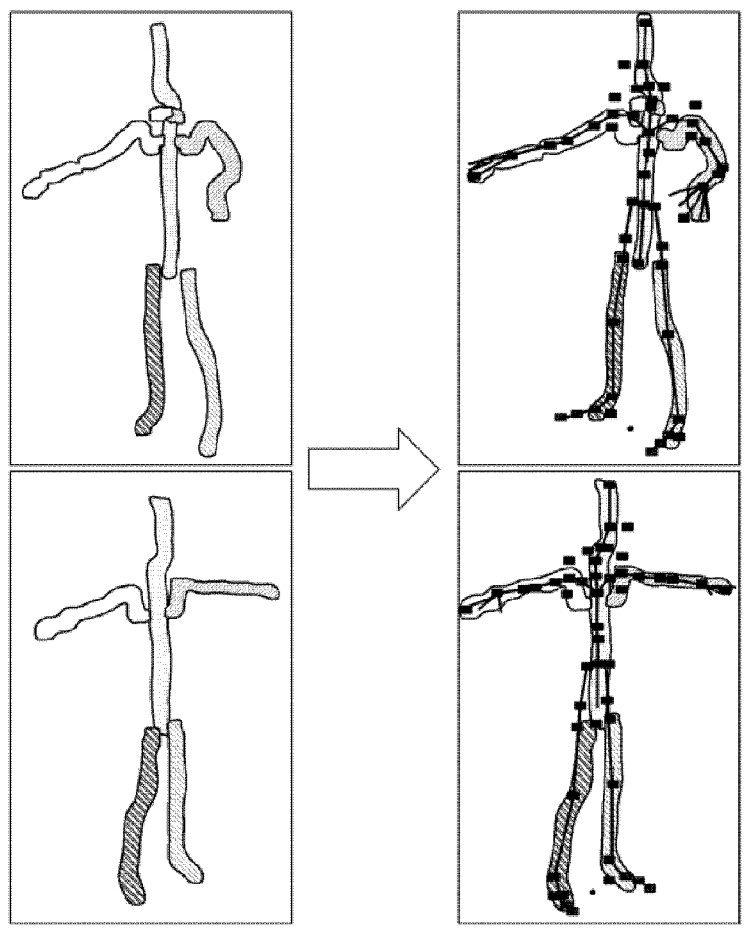
FIG. 6 is a diagram illustrating a skeletal structure of a user according to an embodiment of the present invention.

FIG. 6 is a diagram illustrating a skeletal structure of a user according to an embodiment of the present invention.

An apparatus for fitting a virtual item determines the skeletal structure of the user using a depth image measured by a depth sensor. More particularly, the apparatus for fitting the virtual item determines the skeletal structure of the user based on a 3D shape patch obtained from the depth image, and estimates a joint structure from the skeletal structure of the user.

To this end, the apparatus for fitting the virtual item extracts body height information using information on a 3D skeletal structure for a plurality of body parts and body parts information. Also, the apparatus for fitting the virtual item determines an average length for the plurality of body parts, such as an arm, a leg, a knee, and the like, based on a height of the user, and applies the average length for the plurality of body parts to a 3D skeletal structure. Subsequently, the apparatus for fitting the virtual item matches a curve to the information on the 3D skeletal structure for the plurality of body parts of the user, and estimates a joint position.

In the aforementioned process of estimating the length information, the depth sensor does not provide depth information with respect to a black area such as a hair of the user or an area in which a depth value radically changes at a viewpoint of a camera. In this instance, an error may occur on measuring length information, such as a height. To solve this issue, 3D information is restored with respect to an error area failed to be provided by the depth sensor, through use of color images provided by the depth sensor. The depth information obtained from the depth sensor is projected to a color image of the depth sensor based on camera calibration information, and in this example, the depth information is not projected to a hair portion because the depth information of the depth sensor is absent in the hair portion. Information on the hair portion is obtained from the color image by searching for a neighboring similar color through use of a color value of the color image to which the depth information is projected. When a user is assumed to be present for measuring, a 3D surface on which a head is disposed is calculated based on depth information detected from a face portion, a coordinate value of a pixel of a highest point of the hair portion extracted from the color image is back projected to the 3D surface, and height information of the user is precisely measured.

Figure 7:
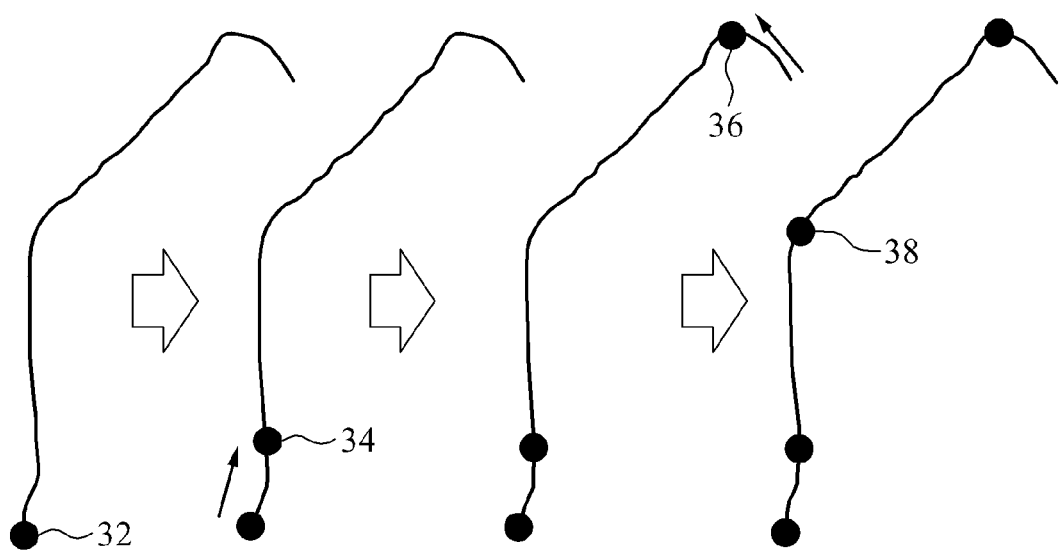
FIG. 7 is a diagram illustrating a process of estimating a joint position of a user according to an embodiment of the present invention.

FIG. 7 is a diagram illustrating a process of estimating a joint position of a user according to an embodiment of the present invention.

Referring to FIG. 7, an apparatus for fitting a virtual item estimates, to be a position 34 of a wrist joint, a portion having a smallest circumference adjacent to an area corresponding to a hand length of the user from a bottom 32 in a 3D skeletal structure of a right arm of the user. Also, the apparatus for fitting the virtual item estimates, to be a position 36 of a shoulder joint, a portion in which a circumference length of a cross section radically changes adjacent to an area estimated to be a shoulder, using user measuring information.

When the positions of the wrist joint and the shoulder joint are estimated, the apparatus for fitting the virtual item estimates a portion farthest from a line connecting the position 34 of the wrist joint and the position 36 of the shoulder joint to be a position 38 of an elbow joint.

As such, the apparatus for fitting the virtual item initially estimates a position of a joint clearly estimated or easily estimated due to having a fold, for example, a knee or an elbow, and automatically estimates a position of a remaining joint yet to be estimated, using the position of the joint initially estimated and the user measuring information. Also, the apparatus for fitting the virtual item estimates an overall skeletal structure of the user assuming a predetermined posture by combining information on the position of the plurality of estimated joints.

Figure 8:
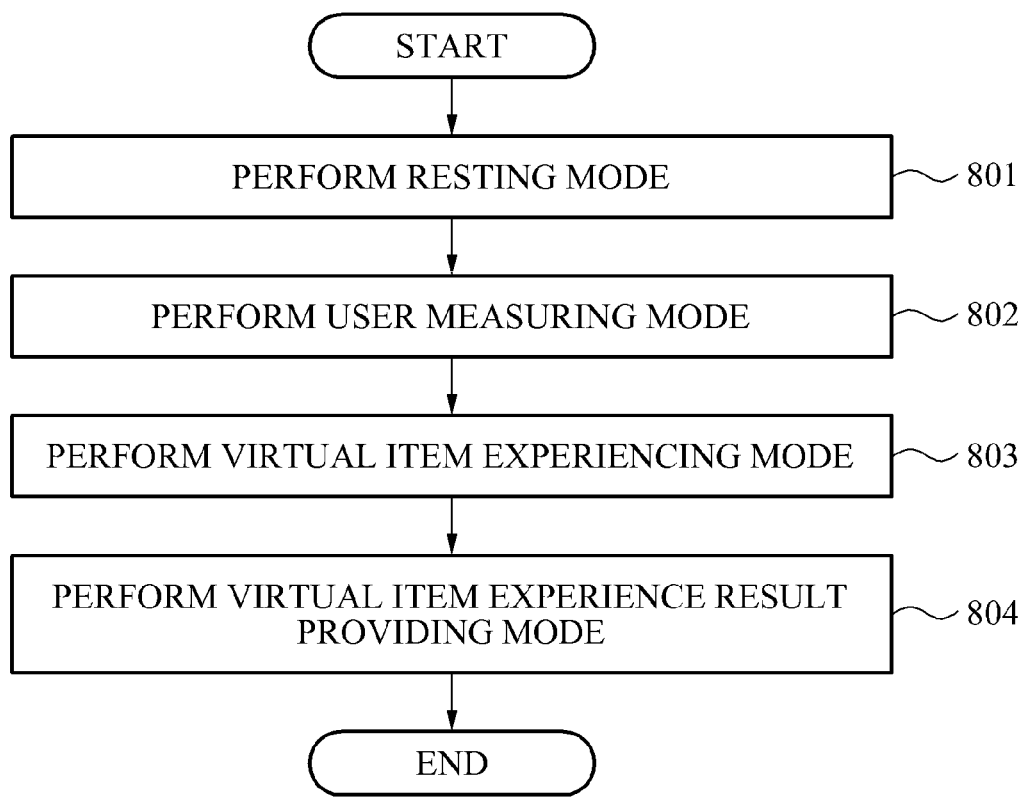
FIG. 8 is a flowchart illustrating a method of fitting a virtual item according to an embodiment of the present invention.

FIG. 8 is a flowchart illustrating a method of fitting a virtual item according to an embodiment of the present invention.

In operation 801, a system for providing a fitting service of a virtual item performs a resting mode. In operation 802, the system for providing the fitting service performs a user measuring mode. In operation 803, the system for providing the fitting service performs a virtual item experience mode. Also, in operation 804, the system for providing the fitting service operates by being classified into a virtual item experience result providing mode. A description of the resting mode is provided in FIGS. 1 and 2 and thus, repeated descriptions will be omitted herein for conciseness. Descriptions pertaining to operation 802, operation 803, and operation 804 will be discussed in FIG. 9, FIG. 10, and FIG. 11, respectively.

Figure 9:
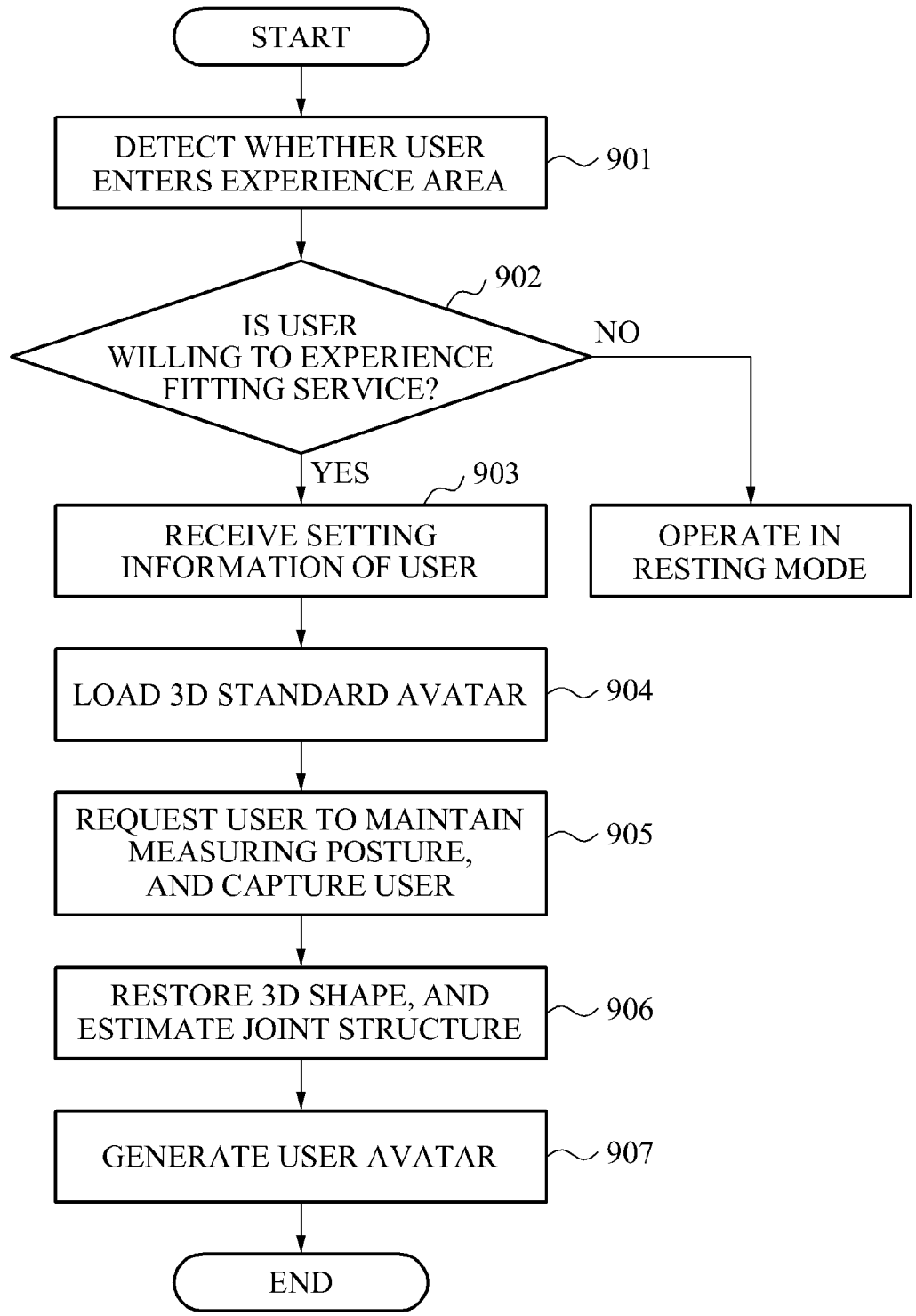
FIG. 9 is a flowchart illustrating a process of operating based on a user measuring mode of FIG. 8 according to an embodiment of the present invention.

FIG. 9 is a flowchart illustrating a process of operating based on a user measuring mode of FIG. 8 according to an embodiment of the present invention.

In operation 901, a system for providing a fitting service detects whether a user enters an experience area. In operation 902, the system for providing the fitting service inquires whether the user is willing to experience a fitting service of a virtual item. In this example, when the user is unwilling to experience the fitting service, the system for providing the fitting service may return to a resting mode. When the user is willing to experience the fitting service, the system for providing the fitting service may receive setting information of the user in operation 903. As used herein, the setting information of the user refers to gender information of the user.

In operation 904, the system for providing the fitting service loads a 3D standard avatar corresponding to the gender information of the user. In operation 905, the system for providing the fitting service requests the user to maintain a predetermined posture for a predetermined period of time, and measures body characteristics of the user maintaining the predetermined posture. In operation 906, the system for providing the fitting service restores a 3D shape of the user based on a depth image, and estimates a joint structure. In operation 907, the system for providing the fitting service generates a user avatar reflecting the body characteristics of the user in the 3D standard avatar. More particularly, the system for providing the fitting service transforms joint length information and volume information of the 3D standard avatar, and generates the user avatar. For details as to the process of generating the user avatar reference may be made to FIGS. 2 through 6.

Figure 10:
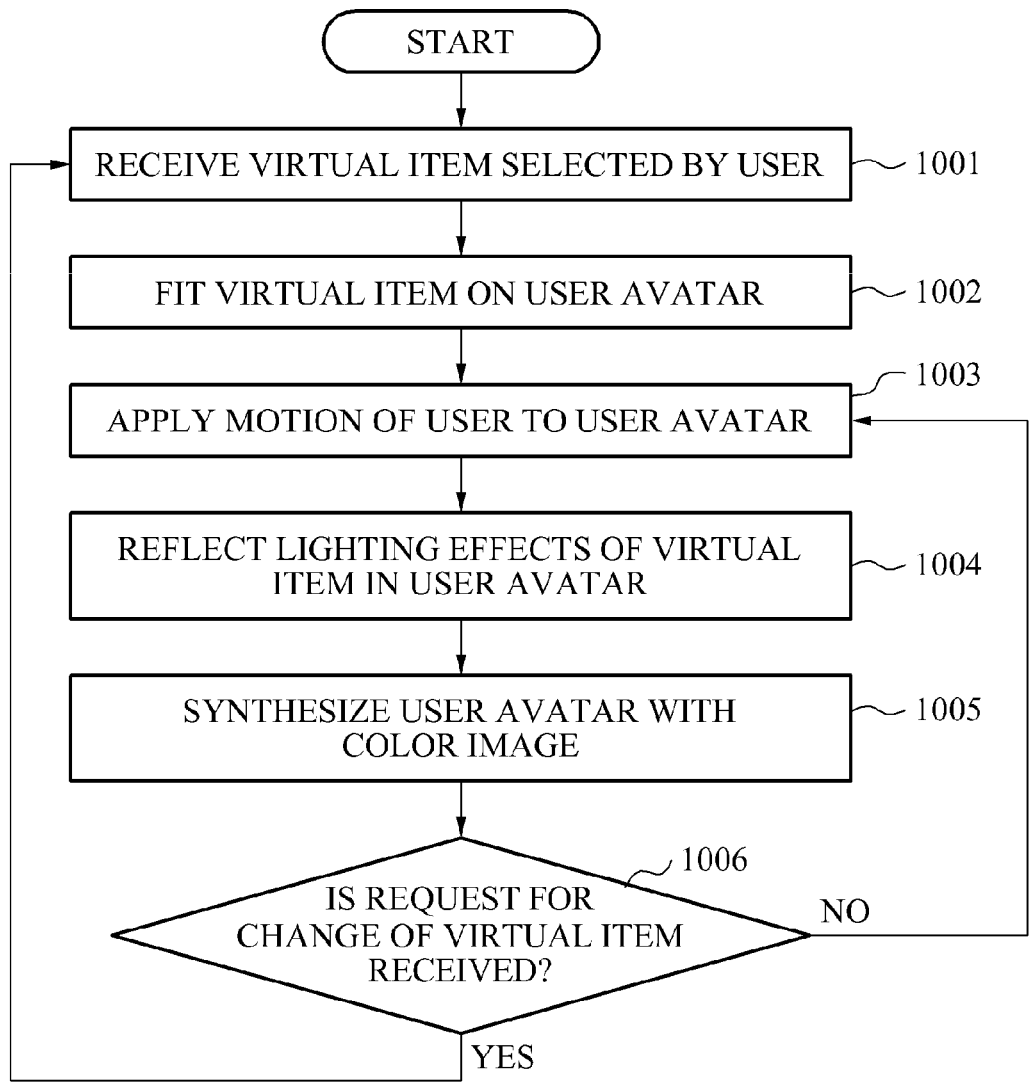
FIG. 10 is a flowchart illustrating a process of operating based on a virtual item experience mode of FIG. 8 according to an embodiment of the present invention.

FIG. 10 is a flowchart illustrating a process of operating based on a virtual item experience mode of FIG. 8 according to an embodiment of the present invention.

In operation 1001, a system for providing a fitting service receives a result of selecting a virtual item from a user. In particular, the user selects a virtual item desired to be fitted by the user from among a plurality of virtual items.

In operation 1002, the system for providing the fitting service fits a virtual item on a user avatar. As described in the preceding, the user avatar reflects, from a 3D standard avatar, body characteristics of the user, for example, joint structure information and volume information, using a 3D shape patch obtained from a depth image.

For one example, a plurality of virtual items may be assumed to be fitted on the 3D standard avatar. In this example, the system for providing the fitting service reflects a displacement corresponding to a degree of a displacement between a mesh of the 3D standard avatar and a mesh of the user avatar, occurring when the 3D standard avatar is transformed into the user avatar, using a distance between a plurality of vertices configuring a virtual item and the mesh of the 3D standard avatar. Transitively, the 3D standard avatar fitted with the virtual item may easily be transformed into the user avatar fitted with the virtual item. For example, the system for providing the fitting service enables the virtual item fitted on the 3D standard avatar to be transformed concurrently with the user avatar being generated from the 3D standard avatar, allowing the virtual item to be fitted on the user avatar.

Also, the virtual item may be easily fitted on the user avatar, using a simple physics simulation engine or a conventional commercial simulation engine, such as a mass-spring model, for example, NVIDIA PhysX or APEX.

In operation 1003, the system for providing the fitting service applies a motion of the user to the user avatar. When the 3D standard avatar is rigged, in a process of generating a user avatar through transforming joint information and applying volume information according to the exemplary embodiment of the present invention, a correlation coefficient, for example, a skin weight, defining a degree of a motion of a plurality of vertices based on a motion of joints amongst the plurality of vertices configuring a joint structure and a shape of the 3D standard avatar may be maintained in the user avatar. Consequently, the user avatar controls rotation and movement for a plurality of joints configuring a joint structure of the user avatar, and determines a shape of the user avatar corresponding to shape transformation of the standard avatar.

For one example, the system for providing the fitting service motion retargets, in real time, motion information of the user input from a depth sensor, corresponding to the joint structure of the user avatar, and controls the shape of the user avatar. Also, the system for providing the fitting service controls a position for a plurality of vertices of the virtual item fitted on the user avatar to be transformed corresponding to the shape of the user avatar by simulating, and transforms the virtual item corresponding to the motion of the user.

The system for providing the fitting service applies motion information of the user input from a depth sensor to the user avatar based on 3 degrees of freedom (DOF) rotation and 3 DOF movement of a joint configuring the joint structure of the user avatar, and reflects the motion of the user in the user avatar.

In this example, when the depth sensor provides the motion information of the user, the system for providing the fitting service controls local rotation and movement of about 20 joints to correspond to the user avatar. When the depth sensor does not provide the motion information, the motion of the user may be reflected in the user avatar, based on descriptions provided in FIGS. 6 and 7.

When the depth sensor provides the motion information of the user, the 3 DOF movement of the joint in which a hip center joint, for example, a root joint, moves in a standard coordinate system provided by the depth sensor may change vertically, irrespective of an intention, based on a degree of the motion of the user being input to an angle of view of the depth sensor. By way of example, such a change may occur when lower body part information below a hip of the user is not collected. In this example, the user avatar reflecting the motion of the user moves vertically resulting in an error, and thus a realistic experience of fitting a virtual item may be difficult.

According to the present exemplary embodiment, an undesired vertical movement of the hip center is controlled using 3D shape information of the user avatar of which the shape is controlled using retargeted motion information provided by the depth sensor and depth information of an image frame obtained from the depth sensor.

For example, when the user approaches the system for providing the fitting service, the lower body part information of the user may not be provided to the depth sensor. Accordingly, the motion information of the user provided by the depth sensor may move vertically in a predetermined direction centered on the hip center. As such, the shape of the user avatar of which the motion information of the user moving vertically in the predetermined direction is retargeted may be transformed in an undesired direction. Thus, a difference between a top and a bottom of a shoulder of the user may be calculated when a 3D shape patch of a depth image input in an identical frame is compared, centered on a standard coordinate system.

The system for providing the fitting service reverse-reflects the calculated difference of the top and the bottom of the shoulder in a result of the retargeting with respect to the motion of the user avatar, controls motion information of a joint to offset the difference error, and maps a mesh shape of the shoulder of the user avatar to a mesh shape of a shoulder of the depth image. In particular, the system for providing the fitting service may prevent shoulder shakes by reverse-controlling a root joint of the user avatar.

In operation 1004, the system for providing the fitting service reflects lighting effects of a virtual item in the user avatar.

In more detail, the system for providing the fitting service renders the virtual item in a realistic sense by reflecting surrounding lighting effects. For one example, the system for providing the fitting service captures, in advance, a hemispherical type or cubic type environment map provided in the system for providing the fitting service with respect to a 3D mesh of the virtual item transformed based on the motion of the user avatar. Accordingly, the system for providing the fitting service realistically renders the virtual item using a ray tracing method or a shader method for a plurality of 3D meshes with respect to a light source disposed in a space. Based on the ray tracing method or the shader method, when various environment maps, for example, external conditions such as a solar light and office environments such as a fluorescent light, are established in advance, and the virtual item is rendered through use of such environment maps, the user is provided with support in virtually experiencing clothes selected by the user and predicting a sense of color of the clothes in a corresponding environment.

In operation 1005, the system for providing the fitting service synthesizes the user avatar and a color image. More particularly, the system for providing the fitting service renders a result of the fitting of the virtual item on the user avatar on the color image, and provides a result of the synthesizing based on an augmented reality. Subsequently, the system for providing the fitting service provides the result of the fitting of the virtual item to the user via a display. The user is provided with a result of the user avatar fitted with a virtual item selected by the user being controlled in conjunction with the motion of the user in real time. In this example, the user is provided with a service of verifying a relatively more realistic color when capturing an image while setting the image to a sensor parameter value, for example, a white balance and gamma, that enables a preview of a corresponding color sense when the image is captured in a video camera to verify a color sense in various environments.

For one example, the system for providing the fitting service synthesizes a rendered image of the user avatar fitted with the virtual item with a color image capturing the user, using geometry calibration information, and provides the user with a result of the synthesizing in real time via the display. When a plurality of sensors collecting a depth image and a color image is precisely geometry calibrated, image synthesizing may be readily implemented through the augmented reality.

The system for providing the fitting service provides a color image of the user in a manner similar to the user viewing a mirror as in a mirror mode. In this example, the color image represented in the mirror mode may be represented through the sensor collecting the color image, for example, a video camera.

However, when the sensor does not provide the mirror mode, the system for providing the fitting service converts the motion information of the user into a sensor coordinate system, using geometry calibration information of the plurality of sensors. Also, the system for providing the fitting service implements the mirror mode by moving symmetrically, centered on an axis of a local coordinate system configuring a horizontal axis of an image in the local coordinate system.

In operation 1006, when a request for changing a virtual item is received from the user, the system for providing the fitting service returns to operation 1001. When the request for changing the virtual item is yet to be received, the system for providing the fitting service applies the motion of the user changing in real time to the user avatar.

FIG. 11 is a flowchart illustrating a process of operating based on a virtual item experience result providing mode of FIG. 8 according to an embodiment of the present invention.

In operation 1101, a system for providing a fitting service provides a result of synthesizing a user avatar with a color image.

In operation 1102, when a user selects a user avatar synthesized with a color image in a posture desired by the user with respect to a virtual item experienced by the user, the system for providing the fitting service receives a result of the selection. Subsequently, the system for providing the fitting service captures a screen of the user avatar selected by the user.

In operation 1103, the system for providing the fitting service generates an identification tag associated with purchase information and figure information on the virtual item at a time when the user selects the virtual item. For one example, the system for providing the fitting service generates, in a form of a smart code, such as a QR code, the purchase information, for example, a location, contact information, and website link information of a purchase location of the virtual item selected by the user.

Further, the system for providing the fitting service generates, in a separate form of the QR code, the figure information of a virtual item required to be repaired subsequently, such as a length and a hem of the virtual item selected by the user. Such figure information may be stored in a separate DB connectable by a repair service center. Subsequently, the repair service center receives the figure information via the QR code, and verifies the figure information by connecting to the DB.

In operation 1104, the system for providing the fitting service provides the captured screen of the user avatar, overlaid with the generated identification tag. The captured screen may be provided in various manners, for example, photo printing, e-mail transmission, interworking with a social networking service, and the like.

When a user maintains a predetermined posture for a predetermined period of time, a system for providing a fitting service generates a user avatar reflecting a shape of the user in real time, and reflects a real-time motion of the user subsequent to reflecting a virtual item selected by the user. Also, the user avatar, to which the virtual item selected by the user is applied, is provided to an augmented reality via a display disposed in front of the user, in order to verify an overall look of the user fitted with the virtual item instantly, as well as fitting information of the virtual item.

According to the present exemplary embodiment, it is possible to readily determine whether an item desired by a user is fitted by virtually fitting the item without actually being worn by the user.

According to the present exemplary embodiment, it is possible to verify an overall look and readily determine a virtual item suitable for a user by fitting the virtual item on a user avatar reflecting body characteristics of the user.

According to the present exemplary embodiment, it is possible to provide realistic effects of a user actually wearing a virtual item and moving by reflecting a motion of the user in a user avatar fitted with the virtual item.

According to the present exemplary embodiment, it is possible to overlay an identification tag reflecting purchase information and figure information on a virtual item on a captured screen of a user avatar, readily purchase the virtual item, and efficiently repair the virtual item later.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of fitting a virtual item, the method comprising:
   determining whether a user is located in an experience area;
   loading a three-dimensional (3D) standard avatar corresponding to setting information input by the user when the user is located in the experience area;
   obtaining a depth image of the user corresponding to a preset posture;
   transforming the 3D standard avatar into a user avatar reflecting body characteristics of the user using the depth image of the user;
   fitting a virtual item selected by the user to the user avatar;
   applying a motion of the user changing in real time to the user avatar to which the virtual item is fitted;
   calculating transformation of the virtual item when the motion of the user is applied to the user avatar;
   synthesizing a result of rendering of the transformed virtual item with a real color image of the user captured by a camera; and
   displaying a result image rendered based on the synthesized result,
   wherein the calculating comprises reverse-reflecting calculated difference of top and bottom of shoulder in a result of retargeting with respect to motion of the user avatar, and controlling motion information of a joint to offset difference error.

2. The method of claim 1, wherein the transforming of the 3D standard avatar into the user avatar reflecting the appearance of the body characteristics of the user comprises:
   restoring a 3D shape patch from the depth image of the user;
   changing joint length information of the 3D standard avatar, using the 3D shape patch; and
   changing volume information of the 3D standard avatar using the 3D shape patch.

3. The method of claim 2, wherein the restoring of the 3D shape patch comprises:
   representing the depth image in a 3D mesh using depth information of a current pixel and an adjacent pixel of the depth image; and
   determining a 3D position of a vertex configuring the 3D mesh based on the depth information and calibration information.

4. The method of claim 2, wherein the changing of the joint length information of the 3D standard avatar comprises:
   estimating a joint structure of the user using the 3D shape patch; and
   extracting joint length information of the user from the estimated joint structure, and applying the extracted joint length information to the joint length information of the 3D standard avatar.

5. The method of claim 2, wherein the changing of the volume information of the 3D standard avatar comprises:
   generating a cross section vertical to a progressive direction of a joint from the joint structure of the user estimated from the 3D shape patch; and
   adjusting the volume information of the 3D standard avatar using an intersection of the restored 3D shape patch and the cross section.

6. The method of claim 1, wherein the fitting of the virtual item selected by the user to the user avatar comprises:
   determining a displacement between a mesh of the 3D standard avatar and a mesh of the user avatar; and
   applying the determined displacement to a vertex of the virtual item.

7. The method of claim 1, wherein the applying of the detected motion of the user changing in real time to the user avatar fitted with the virtual item comprises:
   retargeting a motion of the user avatar based on 3 degrees of freedom (DOF) rotation and 3 DOF movement of a joint configuring the joint structure of the user avatar.

8. The method of claim 1, wherein the applying of the detected motion of the user changing in real time to the user avatar fitted with the virtual item comprises:
   rendering lighting effects to the virtual item based on the motion of the user avatar.

9. The method of claim 1, further comprising:
   synthesizing the user avatar fitted with the virtual item with the color image of the user, and providing the user avatar fitted with the virtual item.

10. A method of fitting a virtual item, the method comprising:
    providing an interface for selecting a virtual item to a user located in an experience area for a fitting service of a virtual item;

displaying a user avatar fitted with a virtual item selected by the user;

calculating transformation of the virtual item when the motion of the user is applied to the user avatar;

synthesizing a result of rendering of the transformed virtual item with a real color image of the user captured by a camera;

displaying a result image rendered based on the synthesized result;

generating an identification tag associated with purchase information or figure information on a virtual item when the user selects the displayed user avatar; and providing a captured screen of the user avatar, overlaid with the generated identification tag, wherein the calculating comprises reverse-reflecting calculated difference of top and bottom of shoulder in a result of retargeting with respect to motion of the user avatar, and controlling motion information of a joint to offset difference error.

11. The method of claim 10, wherein the displaying of the user avatar fitted with the virtual item selected by the user comprises:

transforming a three-dimensional (3D) standard avatar corresponding to setting information input by the user into the user avatar reflecting body characteristics of the user, and displaying the transformed user avatar.

12. The method of claim 11, wherein the user avatar corresponds to an avatar of which joint length information and volume information of the 3D standard avatar are changed based on the body characteristics of the user.

13. A system for providing a fitting service of a virtual item, the system comprising:

a display to display an experience image of a user to provide a fitting service of a virtual item to the user;

an apparatus for capturing a color image to capture the user in real time, and collect a color image of the user;

an apparatus for capturing a depth image to measure a motion and a body size of the user;

an apparatus for fitting a virtual item to convert a three-dimensional (3D) standard avatar into a user avatar based on the motion and the body size of the user, and fit a virtual item to the user avatar;

an apparatus for calculating transformation of the virtual item when the motion of the user is applied to the user avatar;

an apparatus for synthesizing a result of rendering of the transformed virtual item with a real color image of the user captured by a camera; and an apparatus for displaying a result image rendered based on the synthesized result, wherein the apparatus for fitting the virtual item synthesizes the user avatar fitted with the virtual item with the color image, and transmits the user avatar fitted with the virtual item to the display, and the apparatus for calculating transformation comprises reverse-reflects calculated difference of top and bottom of shoulder in a result of retargeting with respect to motion of the user avatar, and controlling information of a joint to offset difference error.

14. The system of claim 13, wherein the apparatus for fitting the virtual item changes joint length information and volume information of the 3D standard avatar using a 3D shape patch restored from a depth image of the user.

15. The system of claim 13, wherein the apparatus for fitting the virtual item retargets a motion of the user avatar based on 3 degrees of freedom (DOF) rotation and 3 DOF movement of a joint configuring a joint structure of the user avatar.

16. The system of claim 13, wherein the apparatus for fitting the virtual item renders lighting effects to the virtual item based on the motion of the user avatar.

* * * * *